United States Patent
Tsirkin

(10) Patent No.: US 11,573,815 B2
(45) Date of Patent: Feb. 7, 2023

(54) DYNAMIC POWER MANAGEMENT STATES FOR VIRTUAL MACHINE MIGRATION

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 175 days.

(21) Appl. No.: 16/862,461

(22) Filed: Apr. 29, 2020

(65) Prior Publication Data

US 2021/0342173 A1 Nov. 4, 2021

(51) Int. Cl.
| | |
|---|---|
| G06F 9/455 | (2018.01) |
| G06F 9/48 | (2006.01) |
| G06F 9/30 | (2018.01) |
| G06F 1/3203 | (2019.01) |
| G06F 11/30 | (2006.01) |
| G06F 9/54 | (2006.01) |

(52) U.S. Cl.
CPC ........ *G06F 9/45558* (2013.01); *G06F 1/3203* (2013.01); *G06F 9/30076* (2013.01); *G06F 9/45545* (2013.01); *G06F 9/4812* (2013.01); *G06F 9/542* (2013.01); *G06F 11/3062* (2013.01); *G06F 2009/4557* (2013.01); *G06F 2009/45591* (2013.01)

(58) Field of Classification Search
CPC ............... G06F 9/45558; G06F 1/3203; G06F 9/30076; G06F 9/45545; G06F 9/4812; G06F 9/542; G06F 11/3062; G06F 2009/4557; G06F 2009/45591
See application file for complete search history.

(56) References Cited

U.S. PATENT DOCUMENTS

| | | |
|---|---|---|
| 9,026,824 B2 | 5/2015 | Davis et al. |
| 9,483,297 B2 | 11/2016 | Tsirkin |
| 9,772,860 B2 | 9/2017 | Oney et al. |

(Continued)

FOREIGN PATENT DOCUMENTS

CN 103685250 A 3/2014

OTHER PUBLICATIONS

Microsoft, "Set up Dynamic and Power Optimization in VMM", https://docs.microsoft.com/en-us/system-center/vmm/vm-optimization?view=sc-vmm-2019, Mar. 14, 2019, 7 pages.

(Continued)

*Primary Examiner* — Emerson C Puente
*Assistant Examiner* — Jonathan R Labud
(74) *Attorney, Agent, or Firm* — Lowenstein Sandler LLP

(57) ABSTRACT

Systems and methods for supporting dynamic power management states for virtual machine (VM) migration are disclosed. In one implementation, a processing device may generate, by a host computer system, a host power management data structure specifying a plurality of power management states of the host computer system. The processing device may also detect that a VM has been migrated to the host computer system. The processing device may then prevent the VM from performing power management operations and may cause the virtual machine to read the host power management data structure. Responsive to receiving a notification that the VM has read the host power management data structure, the processing device may enable the VM to enter a first power management state of the plurality of power management states.

19 Claims, 5 Drawing Sheets

(56) References Cited

U.S. PATENT DOCUMENTS

| | | | |
|---|---|---|---|
| 9,864,627 B2 | 1/2018 | Wang et al. | |
| 10,121,026 B1* | 11/2018 | Ryland | H05K 7/1414 |
| 10,481,942 B2 | 11/2019 | Kaul | |
| 10,853,284 B1* | 12/2020 | Warkentin | G06F 13/26 |
| 2007/0006227 A1* | 1/2007 | Kinney | G06F 9/45558 |
| | | | 718/1 |
| 2007/0112999 A1* | 5/2007 | Oney | G06F 21/53 |
| | | | 711/6 |
| 2014/0082724 A1* | 3/2014 | Pearson | G06F 21/575 |
| | | | 726/22 |
| 2014/0137107 A1* | 5/2014 | Banerjee | G06F 1/3206 |
| | | | 718/1 |
| 2014/0298340 A1* | 10/2014 | Imaizumi | G06F 9/45558 |
| | | | 718/1 |
| 2017/0147227 A1* | 5/2017 | Stabrawa | G06F 3/065 |
| 2019/0235615 A1* | 8/2019 | Shows | G06F 1/3206 |

OTHER PUBLICATIONS

Mohammad Ali Khoshkholghi et al., "Energy-Efficient Algorithms for Dynamic Virtual Machine Consolidation in Cloud Data Centers", https://ieeexplore.ieee.org/stamp/stamp.jsp?arnumber=7937801, Mar. 30, 2017, pp. 10709-10722, Faculty of Computer Science and Information Technology, University Putra Malaysia.

* cited by examiner

DYNAMIC POWER MANAGEMENT STATES FOR VIRTUAL MACHINE MIGRATION

TECHNICAL FIELD

The disclosure is generally related to virtualization systems, and is more specifically related to dynamic power management states for virtual machine migration.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
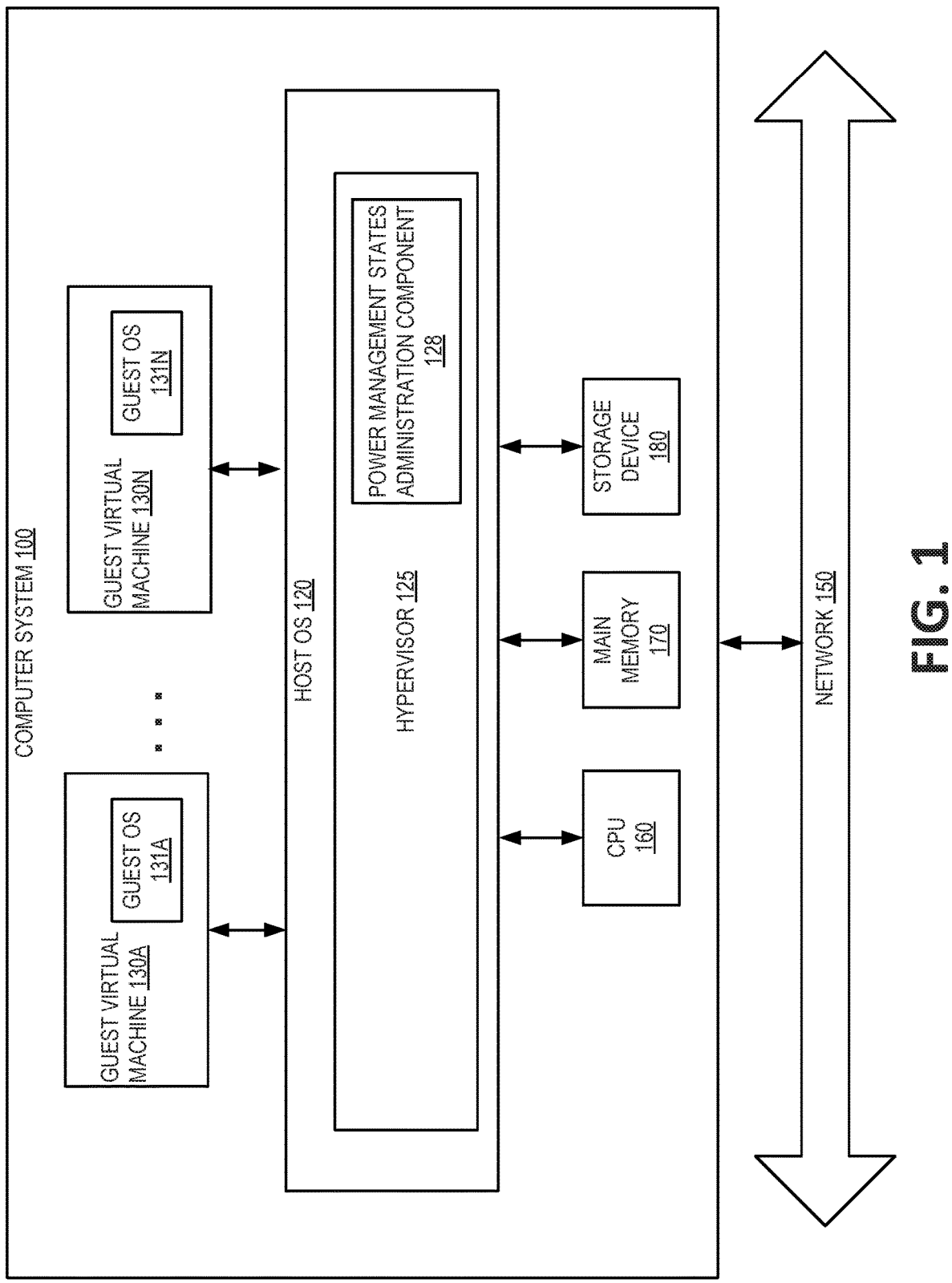
FIG. 1 depicts a high-level diagram of an example system architecture operating in accordance with one or more aspects of the disclosure.

Implementations of the disclosure are directed to dynamic power management states for virtual machine migration.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform.

A virtual machine can utilize one or more hardware configuration data structures (e.g., tables, lists) to store configuration parameters of the underlying physical hardware allocated by the host computer system, including power management states. Power management states refers to a set of idle or power saving states that can be utilized by a processor to decrease the power consumption of the processor before the processor powers down. In virtualized environments, a hypervisor can generate certain hardware configuration tables and provide the hardware configuration tables to one or more virtual machines. Thus, the hypervisor can present the abstraction of the hardware layer to the virtual machines. In some implementations, the hypervisor can generate hardware configuration tables in accordance with the Advanced Configuration and Power Interface (ACPI) Specification. The ACPI Specification provides an open standard for device configuration and power management to the guest operation system.

A virtual machine can be migrated from a host computer system ("the source host computer system") to another host computer system ("the destination host computer system") over a network. As a result of the migration, the power management states of the virtual machine may need to be changed because the underlying power states of the destination host computer system can be different from the power states of the source host computer system. Therefore, it may be unsafe to enable a migrated VM to enter a power management state on the destination host because the migrated VM may be configured based on the power states of the source destination.

In some implementations, in order to avoid having a migrated VM perform an unsafe power management operation (e.g., entering a power management state that is invalid on the destination host), a virtualization environment that enables a guest operating system of the VM to perform power management operations may disable VM migrations. Alternatively, the hypervisor may enable VM migration, but disable power management operations to be performed by migrated virtual machines. While this solution can prevent the VM from entering an unsafe power state, it significantly limits the capabilities of the virtualized environment. In other examples, the hypervisor may send an interrupt to the VM notifying the VM of the power states of the destination host. However, since the VM may consume significant time until it detects and handles the interrupt, the VM may request to enter an invalid power state before handling the interrupt, thus causing unpredictable results on the destination host and the VM.

Aspects of the disclosure address the above and other deficiencies by providing dynamic power management states access for migrated virtual machines (VM). When a hypervisor running on a host computer system detects that a virtual machine has been migrated to the host, the hypervisor may prevent the VM from entering a power management state until the VM re-evaluates its internal power management tables based on the power management configurations of the host. Because the internal power management tables of the migrated VM are configured based on the power management configurations of the source host, it may not be safe to allow the VM to enter a power management state at the destination host. In many cases, the power management states may defer from one cluster or host to another, thus allowing the VM to perform power management operations after migration may result in unpredictable results including host or guest crashes. As an example, when the hypervisor receives a request from the VM to enter a power state, the hypervisor may prevent the VM from entering the power state by performing a NOP (no operation) instruction and returning execution back to the VM. The hypervisor may further perform operations to cause the VM to read the power management states of the host system.

In order to enable the VM to update its internal CPU tables based on the power management states of the host, the hypervisor may notify the VM of the available power management states and cause the VM to update the power management states in its ACPI tables accordingly. For example, the hypervisor may generate a power management data structure (e.g., an ACPI table) including a list of the host power management states of the host. In an example, the data structure may be generated by the host system at start up and may be stored in host memory. The data structure may include, for example, an ACPI processor object (e.g., a CST (C States) object defined by ACPI), a Low Power Idle (LPI) structure defined by ACPI, a Low Power Idle Table (LPIT)) defined by ACPI, etc. In this case, the hypervisor can send a LPI change interrupt to the VM including the power management data structure. Upon receiving the interrupt, a guest operating system of the VM may update the power management configurations in internal CPU tables of the VM based on the power management data structure from the LPI change interrupt.

When the LPI change interrupt is handled by the VM, the VM may notify the hypervisor that the power management states data structure has been read. In some implementations, the VM may send the notification using a paravirtualized interface. Paravirtualization refers to a virtualization technique which involves modifying the guest operating system in order to allow more efficient performance of certain functions in the virtualized environment, as compared to the same operating system running directly on the underlying hardware. Accordingly, a paravirtualized interface refers to an interface that is not implemented in the operating system running directly on the underlying hardware, and is added to the guest operating system in order to allow more efficient performance of certain functions in the virtualized environment. As an example, the guest operating system may update a memory location at a specific address with a predetermined value indicating that the LPI change interrupt has been processed. In another example, the guest operating system may send the notification via a predetermined I/O port, notifying the hypervisor that the LPI change interrupt has been processed and that the power management states of the host has been updated in the VM internal CPU tables.

In one implementation, in order to receive the notification that the LPI change interrupt has been processed by the VM, the hypervisor may read the specific address periodically to determine if the predetermined value has been stored at the address by the VM. In another example, the hypervisor may monitor the predetermined I/O port for the notification from the VM that the LPI has been processed. In implementations, the hypervisor may run a background thread to monitor the location of the notification (e.g., memory address, I/O port, etc.) and detect when the notification is received from the VM. When the hypervisor receives the notification that the LPI change interrupt has been handled by the VM, the hypervisor may determine that it is safe for the VM to enter power states of the host system and may enable the VM to enter the power management states of the host. For example, when the guest operating system sends a request to the hypervisor to place a processor of the host computer system in a specific host power state, the hypervisor may fulfill the request and may place the processor in the power state specified by the guest operating system.

Thus, implementations of the disclosure enables migrated virtual machines, from a source host to a destination host, to perform power management operations at the destination host without requiring that the power management states of the source host to be identical to the power management states of the destination host. This solution enables a more scalable and robust migration capability for virtual machines because it eliminate the need to disable power management functions for migrated VMs. Additionally, exposing the host power management states to the migrated VM, using a LPI change interrupt, as soon as it is detected on the destination host enables the VM to efficiently and promptly updates its power management tables based on the power management configuration of the destination host, thus reducing delays of updating the VM tables based on the destination host power states while eliminating unexpected results of entering a power state that may be invalid on the host.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1. As shown in FIG. 1, the computer system 100 is connected to a network 150 and comprises central processing unit (CPU) 160, main memory 170, which can include volatile memory devices (e.g., random access memory (RAM)), non-volatile memory devices (e.g., flash memory), and/or other types of memory devices, and storage device 180 (e.g., a magnetic hard disk, a Universal Serial Bus (USB) solid state drive, a Redundant Array of Independent Disks (RAID) system, a network attached storage (NAS) array, etc.) that serves as a secondary memory, interconnected as shown. Although, for simplicity, a single CPU is depicted in FIG. 1, in some other embodiments computer system 100 can comprise a plurality of CPUs. Similarly, in some other embodiments computer system 100 can comprise a plurality of storage devices 180, rather than a single storage device 180. The computer system 100 can be a server, a mainframe, a workstation, a personal computer (PC), a mobile phone, a palm-sized computing device, etc. The network 150 can be a private network (e.g., a local area network (LAN), a wide area network (WAN), intranet, etc.) or a public network (e.g., the Internet).

Computer system 100 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest VMs 130A-130N and manages their execution. Each VM 130A-N can be software implementation of a machine that executes programs as though it were an actual physical machine. Each VM 130A-N can have a corresponding guest operating system 131A-N that manages virtual machine resources and provides functions such as inter-process communication, scheduling, memory management, and so forth. It should be noted that in some other examples, hypervisor 125 can be external to host OS 120, rather than embedded within host OS 120. As shown, hypervisor 125 can include power management states administration component 128 that may facilitate dynamic power management states for virtual machine migration.

In certain implementations, power management states administration component 128 can detect that VM 130A has been migrated to host system 100 from a source host system. In order to prevent VM 130A from entering an unsafe power state on host system 100, power management states administration component 128 may prevent VM 130A from entering a power management state until VM 130A updates its internal power management tables based on the power management configurations of host system 100. For example, when hypervisor 125 receives a request from VM 130A to enter a power state, power management states administration component 128 of hypervisor 125 may prevent VM 130A from entering the power state by performing a no operation instruction until power management states administration component 128 detects that VM 130A has updated its CPU tables with power management states of host system 100. Power management states administration component 128 may cause VM 130A to read the power management states of host system 100 and updates its CPU tables accordingly.

In one implementation, power management states administration component 128 may send a power management data structure of host 100 to VM 130A to cause VM 130A to update the power management states in its CPU tables based on the data structure. In an illustrative example, power management states administration component 128 may generate the power management data structure, including a list of the host power management states of host 100 at start up time of host 100. Power management states administration component 128 may send the data structure to VM 130A using a LPI change interrupt that includes the power management data structure. Upon receiving the interrupt, guest operating system 131A of VM 130A may update the power management configurations in internal CPU tables of VM 130A based on the power management data structure of the LPI change interrupt.

When the internal CPU tables are updated with power states from the power management data structure, VM 130A may send a notification to power management states administration component 128 indicating that the power management states data structure has been read. In implementations, VM 130A may send the notification using a paravirtualized interface (e.g., by updating a specific address with a predetermined value, sending data to a specific I/O port, etc.). The notification may indicate to power management states administration component 128 that the LPI change interrupt has been processed and that the power management states of host system 100 has been updated in VM 130A internal CPU tables.

In certain implementations, in order to receive the notification that the LPI change interrupt has been processed by VM 130A, power management states administration component 128 may execute a background thread to monitor a specific location where the notification is expected to be received (i.e., the specific address, the specific I/O port, etc.). As an example, power management states administration component 128 can read the specific address periodically (e.g., every 10 seconds) to determine if the predetermined value has been stored at the address by VM 130A. When power management states administration component 128 determines that the predetermined value is stored at the address, power management states administration component 128 may determine that VM 130A has processed the LPI change interrupt and may determine that it is safe for the VM to enter the power states of host system 100. Consequently, power management states administration component 128 may enable VM130A to enter at least one of the power management states of host 100. For example, when VM 130A sends a request to power management states administration component 128 to enter a power state of the host 100, power management states administration component 128 mat perform the request and enable VM 130A to enter the requested power state.

Figure 2:
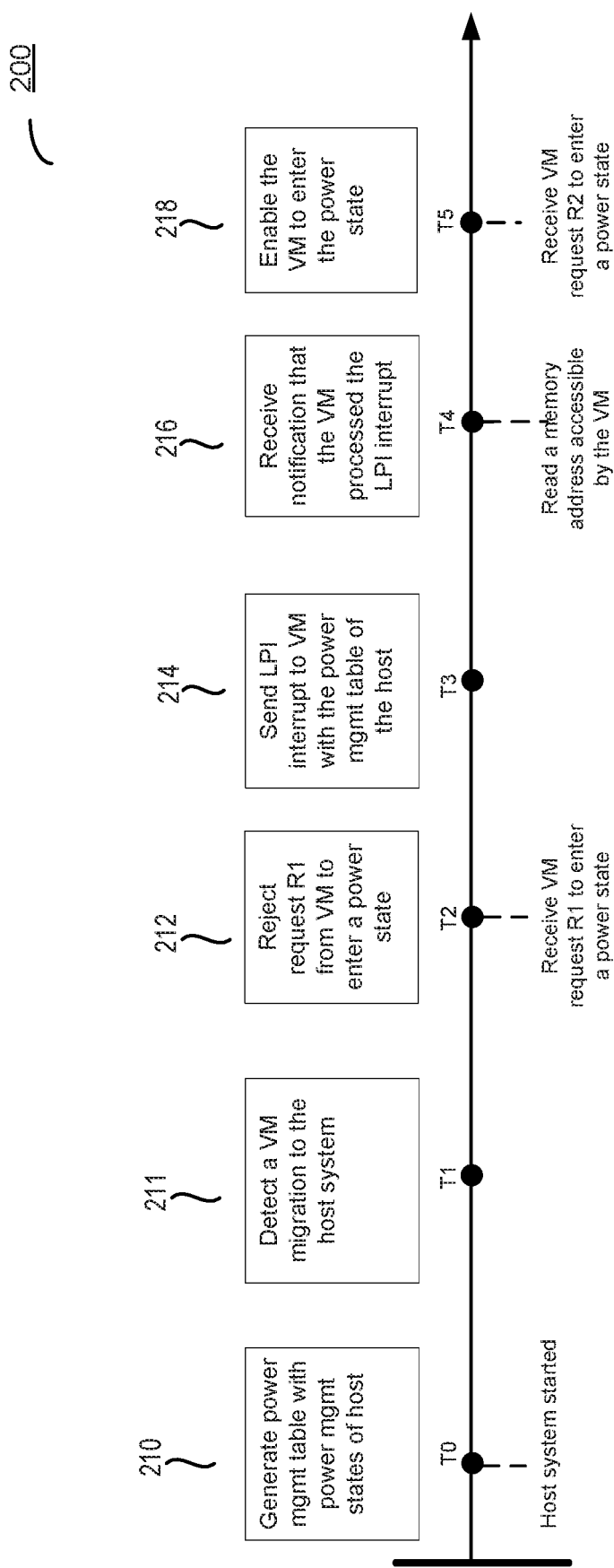
FIG. 2 depicts a sequence diagram illustrating the flow of events for an example method of managing dynamic power management states for virtual machine migration, in accordance with one or more aspects of the present disclosure.

FIG. 2 depicts a sequence diagram illustrating the flow of events for an example method 200 of managing dynamic power management states for virtual machine migration, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., host computer system 100 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

In an illustrative example, at operation 210 the processing logic at time T0 may generate a power management table containing the set of power management states of the host system. In implementations, the power management states may be the valid power management states of CPUs of the host system. The power management table may be created when the host system is starting up and may be kept in memory until the host system shuts down. As an example, the power management table may be used by the host system to evaluate requests to place a CPU of the host system in a specific power state.

At operation 211, the processing logic at time T1 may detect that a virtual machine has been migrated to the host from a source host. After migration, the internal power management tables of the migrated VM may still be configured based on the power management configurations of the source host, thus the processing logic may determine that it may not be safe to allow the VM to enter a power management state at the host until the VM updates its internal power management tables based on the power management sates of the host system. Therefore, the processing logic may temporarily prevent the VM from entering a power management state on the host until the VM re-evaluates its internal power management tables based on the power management configurations of the host.

At operation 212, the processing logic at time T2 may receive a request R1 from the VM to enter a specific power state. In this case, because the power management states at the source host that hosted the VM before migration may defer from the power management states at the host system, the processing logic may prevent the VM from entering the requested power state. As an example, the processing logic may reject the request R1 by performing a no operation instruction and may returning execution back to the VM without enabling the VM to enter the requested power state.

At operation 214, the processing logic at time T3 may send an LPI change interrupt to the VM in order to enable the VM to update its internal CPU tables based on the power management states of the host. For example, the LPI change interrupt may include a data structure containing a list of the power management states of the host, to enable the VM to update the power management states in its CPU tables based on the data structure of the LPI change interrupt. Upon receiving the interrupt, a guest operating system of the VM may process the LPI change interrupt by updating the power management configurations in internal CPU tables of the VM based on the power management states of the host from the data structure. When the VM completes the processing of the LPI change interrupt, the VM may notify the hypervisor that the power management states data structure has been read and that the internal power management tables of the VM have been updates with the post power management states. In implementations, the VM may send the notification by updating a specific memory address that is accessible by the hypervisor with a predetermined value indicating that the LPI change interrupt has been processed.

At operation 216, the processing logic at time T4, the processing logic may receive the notification that the LPI change interrupt has been processed by the VM. As an example, the processing logic may read the specific memory address periodically (e.g., using a background thread to monitor changes to the memory address) to determine if the predetermined value has been stored at the address by the VM. When the processing logic receives the notification that the LPI change interrupt has been handled by the VM, the processing logic may determine that it is safe for the VM to enter power states of the host system and may enable the VM to enter one or more power management states of the host.

At operation 218, the processing logic at time T5, the processing logic may receive a request R2 from the VM to enter the specific power management state of the host system. Detecting that the VM has updated internal power management tables based on the notification, the processing logic may enable the VM to enter the requested power management state. For example, the processing logic may place a physical processor in the power state specified in request R2 and may notify the VM that the request has been fulfilled.

Figure 3:
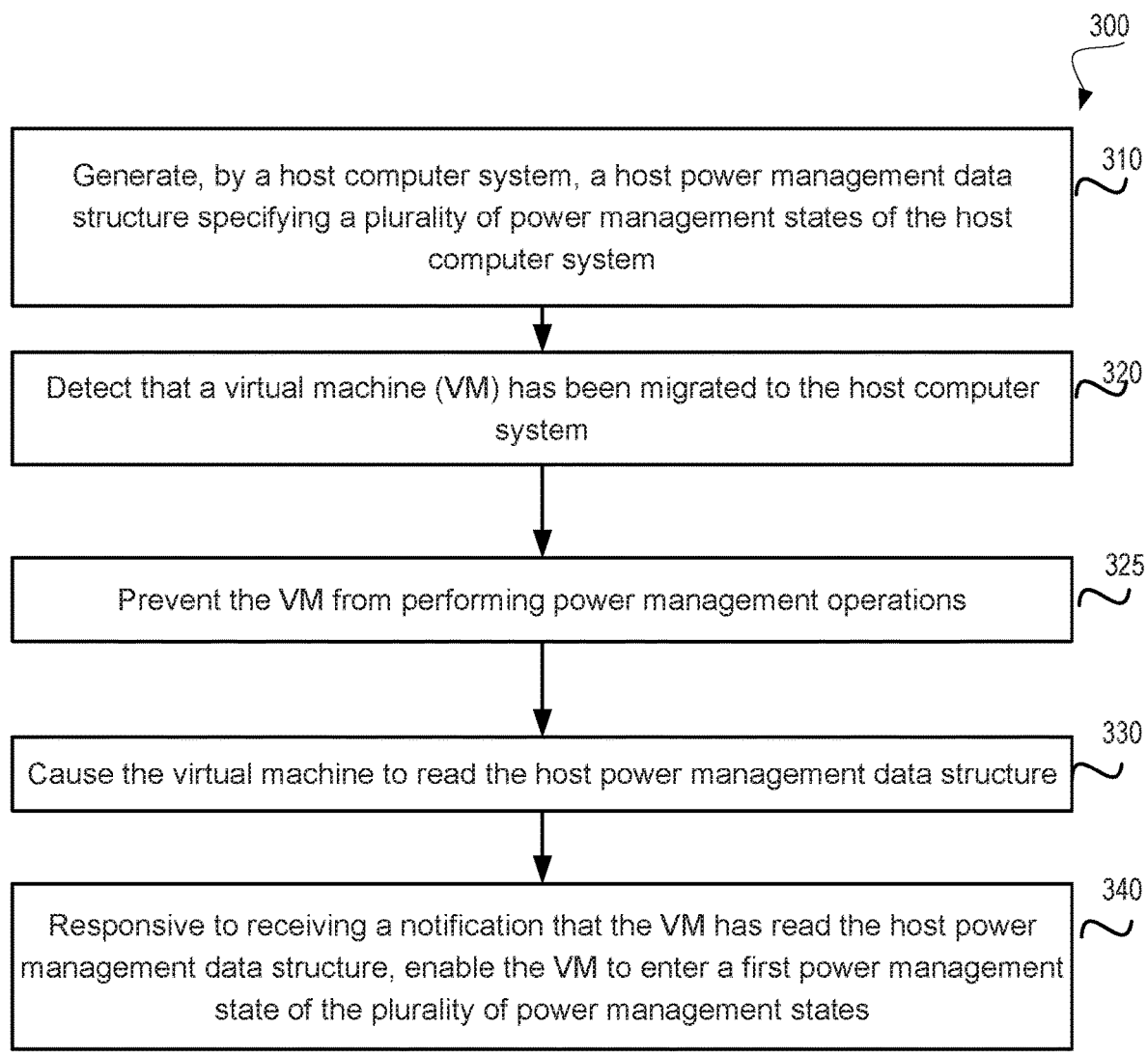
FIG. 3 is a flow diagram of an example method of dynamic power management states for virtual machine migration, in accordance with one or more aspects of the present disclosure

FIG. 3 is a flow diagram of an example method of dynamic power management states for virtual machine migration, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the host computer system 100 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Method 300 may begin at block 310. At block 310, the processing logic may receive, by a hypervisor managing a virtual machine (VM), a hypercall initiated by the VM. The hypercall may have at least two parameters; a first parameter specifying a guest physical address (GPA) of a memory buffer and a second parameter specifying a host virtual address (HVA) of the memory buffer. The memory buffer may be accessed by the hypervisor when executing the hypercall. In implementations, the processing logic may use the HVA to access the memory buffer after validating that the HVA is a correct address for the memory buffer, as described in more detail herein above.

At block 310, the processing logic may generate a host power management data structure that includes a list of the host power management states of host. In implementations, the processing logic may generate the host power management data structure at start up time of the host system, as explained in more details herein above.

At block 320, the processing logic may detect that a virtual machine (VM) has been migrated to the host system. In implementations, the VM may have been migrated from a source host and may have been configured based on the power management states of the source host, as explained in more details herein.

At block 325, the processing logic may prevent the VM from performing power management operations (e.g., placing a CPU in an idle state) until the VM updates its internal power management tables based on the power management states of the host, as explained in more details herein.

At block 330, the processing logic may cause the VM to read the power management data structure of the host by sending the power management data structure to the VM using a LPI change interrupt that includes the power management data structure. The VM may then process the LPI change interrupt and may send a notification that the internal power management tables has been updated with the power management states of the host, as explained in more details herein.

At operation 340, when the processing logic receives the notification from the VM that the LPI change interrupt has been processed, the processing logic may enable the VM to enter a power state of the host (e.g., by fulfilling a request form the VM to enter one of the power management states of the host), as explained in more details herein.

Figure 4:
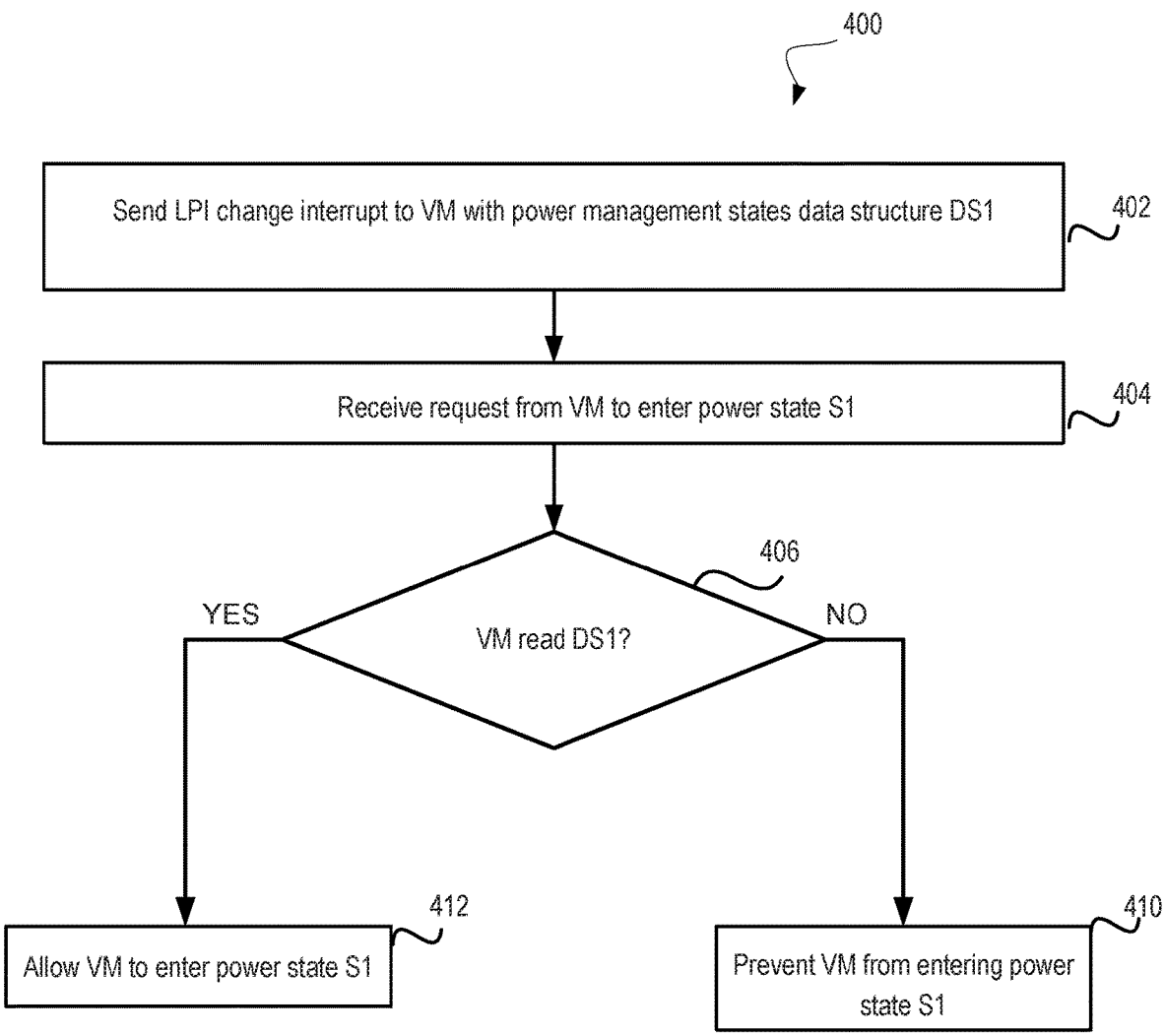
FIG. 4 is a flow diagram of an example method for supporting dynamic power management states for VM migration based on the VM handling of the LPI change interrupt, in accordance with one or more aspects of the present disclosure.

FIG. 4 is a flow diagram of an example method for supporting dynamic power management states for VM migration based on the VM handling of the LPI change interrupt, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., host computer system 100 of FIG. 1) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Method 400 may begin at block 402. At block 402, the processing logic may send to a VM a LPI change interrupt that includes a power management data structure DS1. DS1 may contain the power management states of the host system of the VM. In implementations, the processing logic mat send the LPI change interrupt in response to detecting that the VM has been migrated to the host and has not yet updated its internal power management tables based on the power states of the host.

At operation 404, the processing logic may receive a request from the VM to enter one of the power states of the host (e.g., power state S1). In one implementation, the processing logic may fulfil the request from the VM if the VM has completed the processing of the LPI change interrupt, as explained in more details herein.

At operation 406, the processing logic may determine whether the VM has read and processed DS1 from the LPI change interrupt. In an implementation, the VM may notify the processing logic on the host that the LPI change interrupt has been processed when the VM updates its internal power management tables with the power states from DS1, as explained in more details herein above. Therefore, the processing logic may make a decision on whether to prevent or allow the VM to enter power state S1 based on whether or not the processing logic has received the notification.

At operation 410, when the processing logic determines that the notification from the VM has not been received (e.g., by receiving the notification at a predetermined I/O port), the processing logic may prevent the VM from entering power state S1 (e.g., by executing a no operation instruction). On the other hand, at operation 412, if the processing logic determines that the notification from the VM has been received, the processing logic may allow the VM to enter power state S1 on the host, as explained in more details herein above.

Figure 5:
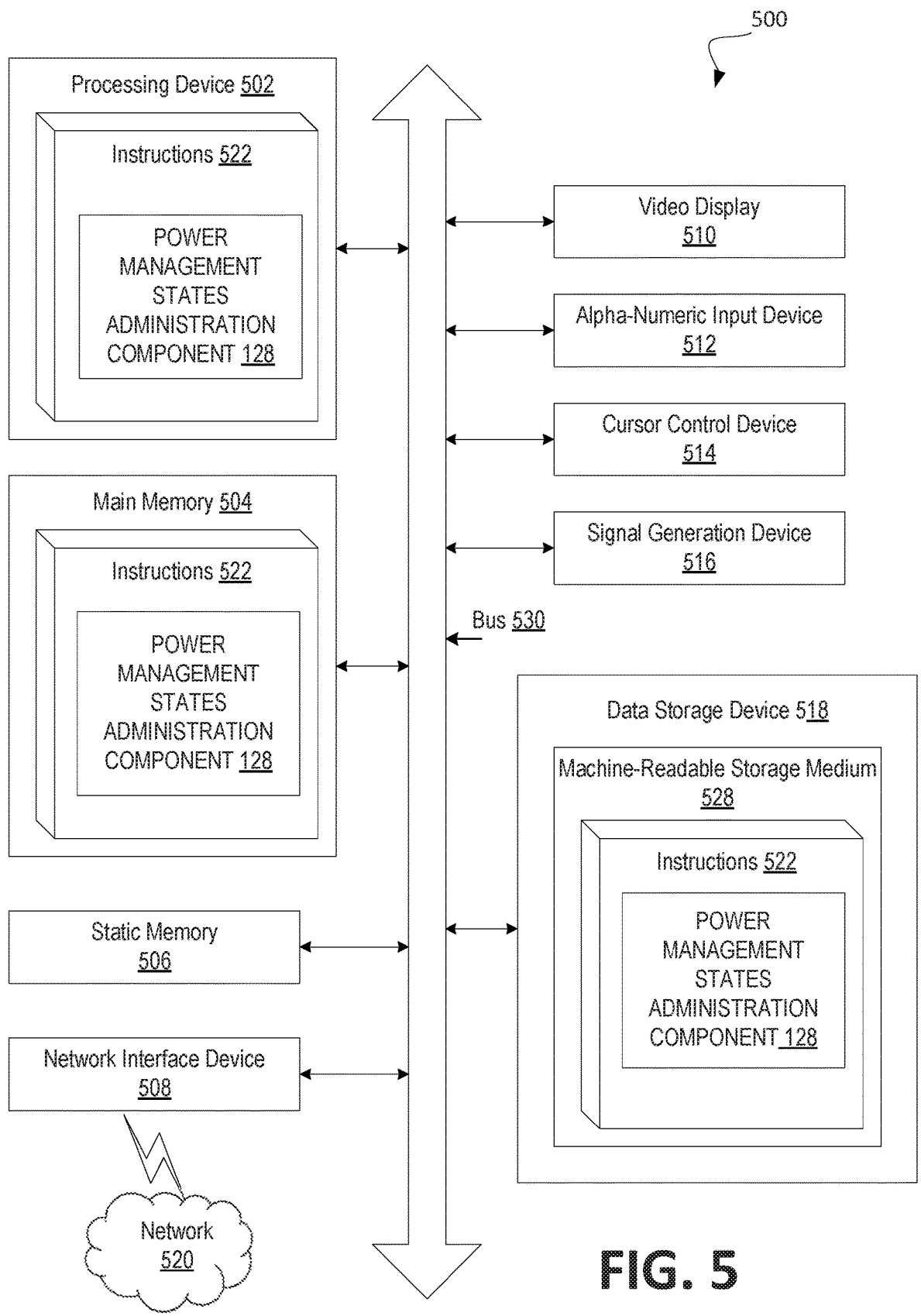
FIG. 5 depicts a block diagram of a computer system operating in accordance with one or more aspects of the disclosure.

FIG. 5 depicts a block diagram of a computer system operating in accordance with one or more aspects of the disclosure. In various illustrative examples, computer system 500 may correspond to a computing device 110 within system architecture 100 of FIG. 1. In one implementation, the computer system 500 may be the computer system 110 of FIG. 1. The computer system 500 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other via a bus 530.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 508. Computer system 500 also may include a video display unit 510 (e.g., an LCD), an alphanumeric input device 512 (e.g., a keyboard), a cursor control device 514 (e.g., a mouse), and a signal generation device 516.

Data storage device 518 may include a non-transitory computer-readable storage medium 528 on which may store instructions 522 embodying any one or more of the methodologies or functions described herein (e.g., power management states administration component 128). Instructions 522 may also reside, completely or partially, within volatile memory 504 and/or within processing device 502 during execution thereof by computer system 500, hence, volatile memory 504 and processing device 502 may also constitute machine-readable storage media.

While computer-readable storage medium 528 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, and 400, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    generating, by a host computer system, a host power management data structure specifying a plurality of power management states of the host computer system;
    detecting that a virtual machine (VM) has been migrated to the host computer system;
    preventing the VM from performing power management operations;
    causing the VM to read the host power management data structure; and
    responsive to receiving a notification that the VM has read the host power management data structure, enabling the VM to enter a first power management state of the plurality of power management states,
    wherein preventing the VM from performing power management operations further comprises:
    receiving a request from the VM to enter the first power management state;
    performing a no-operation (NOP) instruction; and
    returning an execution control to the VM.

2. The method of claim 1, wherein causing the VM to read the host power management data structure further comprises:
    causing the VM to update internal data structures with the plurality of power management states of the host computer system based on the host power management data structure.

3. The method of claim 1, wherein the host power management data structure comprises at least one of a CST object or a Low Power Idle (LPI) table defined by Advanced Configuration and Power Interface (ACPI).

4. The method of claim 3, wherein causing the VM to read the host power management data structure further comprises:
    sending, to the VM, a LPI change interrupt comprising the host power management data structure.

5. The method of claim 1, wherein the host computer system generates the host power management data structure during a start up process of the host computer system.

6. The method of claim 1, wherein receiving the notification that the VM has read the host power management data structure further comprises:
    reading a value stored by the VM at a predetermined address.

7. The method of claim 1, wherein the VM is to send the notification that the VM has read the host power management data structure using a paravirtualized interface.

8. A system comprising:
    a memory;
    a processing device operatively coupled to the memory, the processing device to:
        generate a host power management data structure specifying a plurality of power management states of the host computer system;
        detect that a virtual machine (VM) has been migrated to the host computer system;
        prevent the VM from performing power management operations;
        send, to the VM, an interrupt referencing the host power management data structure; and
        responsive to receiving a notification that the VM has read the host power management data structure, enable the VM to enter a first power management state of the plurality of power management states.

9. The system of claim 8, wherein the processing device is further to:
    cause the VM to update internal data structures with the plurality of power management states of the host computer system based on the host power management data structure.

10. The system of claim 8, wherein the host power management data structure comprises at least one of a CST object or a Low Power Idle (LPI) table defined by Advanced Configuration and Power Interface (ACPI).

11. The system of claim 10, wherein the interrupt comprises
    a LPI change interrupt comprising the host power management data structure.

12. The system of claim 8, wherein the host computer system generates the host power management data structure during a start up process of the host computer system.

13. The system of claim 8, wherein to prevent the VM from performing power management operations, the processing device is further to:
    receive a request from the VM to enter the first power management state;
    perform a no-operation (NOP) instruction; and return an execution control to the VM.

14. The system of claim 8, wherein to receive the notification that the VM has read the host power management data structure, the processing device is further to:
read a value stored by the VM at a predetermined address.

15. A non-transitory computer-readable media storing instructions that, when executed, cause a processing device to:
generate a host power management data structure specifying a plurality of power management states of the host computer system;
detect that a virtual machine (VM) has been migrated to the host computer system;
responsive to receiving, from the VM, a request to enter a first power management state, execute a no-operation (NOP) instruction;
prevent the VM from performing power management operations;
cause the VM to read the host power management data structure; and
responsive to receiving a notification that the VM has read the host power management data structure, enable the VM to enter the first power management state of the plurality of power management states.

16. The non-transitory computer-readable media of claim 15, wherein to cause the VM to read the host power management data structure, the processing device is further to:
cause the VM to update internal data structures with the plurality of power management states of the host computer system based on the host power management data structure.

17. The non-transitory computer-readable media of claim 15, wherein to cause the VM to read the host power management data structure, the processing device is further to:
send, to the VM, a LPI change interrupt comprising the host power management data structure.

18. The non-transitory computer-readable media of claim 15, wherein to prevent the VM from performing power management operations, the processing device is further to:
return an execution control to the VM.

19. The non-transitory computer-readable media of claim 15, wherein to receive the notification that the VM has read the host power management data structure, the processing device is further to:
receive data at a predetermined input/output (I/O) port, the data is sent to the I/O port by the VM.

* * * * *